(12) United States Patent
Aaltonen et al.

(10) Patent No.: US 8,254,880 B2
(45) Date of Patent: Aug. 28, 2012

(54) ACCESS CONTROL

(75) Inventors: Janne Aaltonen, Turku (FI); Ismo Antikainen, Masala (FI); Timo Ahopelto, Helsinki (FI)

(73) Assignee: Apple Inc., Cupertino, CA (US)

( * ) Notice: Subject to any disclaimer, the term of this patent is extended or adjusted under 35 U.S.C. 154(b) by 705 days.

(21) Appl. No.: 12/019,433

(22) Filed: Jan. 24, 2008

(65) Prior Publication Data

US 2008/0287096 A1    Nov. 20, 2008

(30) Foreign Application Priority Data

May 15, 2007    (GB) .................................. 0709331.3

(51) Int. Cl.
*H04M 11/00*    (2006.01)

(52) U.S. Cl. ........................................ 455/406; 455/405

(58) Field of Classification Search .................. 455/406, 455/405

See application file for complete search history.

(56) References Cited

U.S. PATENT DOCUMENTS

| | | |
|---|---|---|
| 5,613,213 A | 3/1997 | Naddell et al. |
| 5,768,521 A | 6/1998 | Dedrick |
| 5,978,775 A | 11/1999 | Chen |
| 5,978,833 A | 11/1999 | Pashley et al. |
| 6,078,866 A | 6/2000 | Buck et al. |
| 6,250,557 B1 | 6/2001 | Forslund et al. |
| 6,269,361 B1 | 7/2001 | Davis et al. |
| 6,334,145 B1 | 12/2001 | Adams et al. |
| 6,408,309 B1 | 6/2002 | Agarwal |
| 6,920,464 B2 | 7/2005 | Fox |
| 7,200,633 B2 | 4/2007 | Sekiguchi et al. |
| 7,428,555 B2 | 9/2008 | Yan |
| 7,668,950 B2 | 2/2010 | Horowitz et al. |
| 7,676,405 B2 | 3/2010 | Steelberg et al. |
| 7,974,988 B2 | 7/2011 | Nandiwada et al. |
| 7,991,140 B2 | 8/2011 | Pines |
| 8,099,490 B2 | 1/2012 | Deakin |
| 2002/0006803 A1 | 1/2002 | Mendiola et al. |
| 2002/0019829 A1 | 2/2002 | Shapiro |

(Continued)

FOREIGN PATENT DOCUMENTS

BE    1015704    7/2005

(Continued)

OTHER PUBLICATIONS

United Kingdom Search Report dated Sep. 18, 2007 for United Kingdom Patent Application No. GB0709331.3.

(Continued)

*Primary Examiner* — Nick Corsaro
*Assistant Examiner* — Amanuel Lebassi
(74) *Attorney, Agent, or Firm* — Novak Druce + Quigg LLP

(57) ABSTRACT

A monitoring device makes decision on whether a service requested by a consumer is a sponsored service to the specific consumer or not based on sponsoring rules, i.e. the delivery of the requested service to the consumer can be sponsored if a sponsoring value of the consumer is sufficient in relation to a charge of delivery of the requested service. The sponsoring rules contain various pieces of information for recognizing a sponsored service and for determining the sponsoring value and the cost of the delivery. The sponsoring of different services to different consumers can be controlled, created, deleted, maintained or modified by means of the sponsoring rules. The sponsor, such an advertiser is able to control the cost of sponsoring by affecting the sponsoring value.

32 Claims, 4 Drawing Sheets

U.S. PATENT DOCUMENTS

| | | | |
|---|---|---|---|
| 2002/0075305 A1 | 6/2002 | Beaton et al. | |
| 2002/0111848 A1 | 8/2002 | White | |
| 2002/0138291 A1 | 9/2002 | Vaidyanathan et al. | |
| 2002/0177431 A1* | 11/2002 | Hamilton et al. | 455/406 |
| 2003/0040297 A1 | 2/2003 | Pecen et al. | |
| 2003/0126015 A1 | 7/2003 | Chan et al. | |
| 2003/0197719 A1 | 10/2003 | Lincke et al. | |
| 2004/0030887 A1* | 2/2004 | Harrisville-Wolff et al. | 713/155 |
| 2004/0093289 A1 | 5/2004 | Bodin | |
| 2004/0203851 A1 | 10/2004 | Vetro et al. | |
| 2004/0204133 A1 | 10/2004 | Andrew et al. | |
| 2004/0209649 A1 | 10/2004 | Lord | |
| 2004/0259526 A1 | 12/2004 | Goris et al. | |
| 2005/0084081 A1* | 4/2005 | Manto | 379/114.05 |
| 2005/0125397 A1 | 6/2005 | Gross et al. | |
| 2005/0160002 A1 | 7/2005 | Roetter et al. | |
| 2005/0177506 A1 | 8/2005 | Rissanen | |
| 2005/0222949 A1 | 10/2005 | Inotay et al. | |
| 2005/0228680 A1 | 10/2005 | Malik | |
| 2005/0239504 A1 | 10/2005 | Ishii et al. | |
| 2005/0240475 A1 | 10/2005 | Margiloff et al. | |
| 2005/0273465 A1 | 12/2005 | Kimura | |
| 2005/0281237 A1 | 12/2005 | Heinonen et al. | |
| 2006/0026067 A1 | 2/2006 | Nicholas et al. | |
| 2006/0048059 A1 | 3/2006 | Etkin | |
| 2006/0068845 A1 | 3/2006 | Muller et al. | |
| 2006/0117378 A1 | 6/2006 | Tam et al. | |
| 2006/0123014 A1 | 6/2006 | Ng | |
| 2006/0200460 A1 | 9/2006 | Meyerzon et al. | |
| 2006/0240850 A1 | 10/2006 | Kaplan | |
| 2006/0271438 A1 | 11/2006 | Shotland et al. | |
| 2006/0286963 A1 | 12/2006 | Koskinen et al. | |
| 2006/0286964 A1 | 12/2006 | Polanski et al. | |
| 2006/0288124 A1 | 12/2006 | Kraft et al. | |
| 2007/0041536 A1* | 2/2007 | Koskinen et al. | 379/114.28 |
| 2007/0050372 A1 | 3/2007 | Boyle | |
| 2007/0060109 A1* | 3/2007 | Ramer et al. | 455/414.1 |
| 2007/0066295 A1 | 3/2007 | Wennberg | |
| 2007/0074262 A1 | 3/2007 | Kikkoji et al. | |
| 2007/0100805 A1 | 5/2007 | Ramer et al. | |
| 2007/0162328 A1 | 7/2007 | Reich | |
| 2007/0174124 A1 | 7/2007 | Zagofsky et al. | |
| 2007/0244750 A1 | 10/2007 | Grannan et al. | |
| 2007/0271134 A1 | 11/2007 | Ferry et al. | |
| 2008/0057917 A1 | 3/2008 | Oria | |
| 2008/0065474 A1 | 3/2008 | Sharma et al. | |
| 2008/0065491 A1 | 3/2008 | Bakman | |
| 2008/0103895 A1 | 5/2008 | Burdick et al. | |
| 2008/0201731 A1 | 8/2008 | Howcroft | |
| 2008/0221989 A1 | 9/2008 | Messer et al. | |
| 2008/0228893 A1 | 9/2008 | MacDonald et al. | |
| 2008/0249850 A1 | 10/2008 | Szybalski et al. | |
| 2008/0263460 A1 | 10/2008 | Altberg et al. | |
| 2008/0306820 A1 | 12/2008 | Passmore | |
| 2009/0037239 A1 | 2/2009 | Wong et al. | |
| 2009/0043644 A1 | 2/2009 | Wilkman | |
| 2009/0106100 A1 | 4/2009 | Mashinsky | |
| 2009/0199107 A1 | 8/2009 | Lewis et al. | |
| 2009/0222316 A1 | 9/2009 | Boinepalli et al. | |
| 2009/0276317 A1 | 11/2009 | Dixon et al. | |
| 2009/0282052 A1 | 11/2009 | Evans et al. | |
| 2010/0082401 A1 | 4/2010 | Vee et al. | |
| 2010/0082439 A9 | 4/2010 | Patel et al. | |
| 2010/0106606 A1 | 4/2010 | Filice et al. | |
| 2010/0121694 A1 | 5/2010 | Bharadwaj et al. | |
| 2010/0131352 A1 | 5/2010 | Malhotra et al. | |

FOREIGN PATENT DOCUMENTS

| | | |
|---|---|---|
| DE | 19941461 | 3/2001 |
| DE | 2008040 | 3/2005 |
| EP | 1003344 | 5/2000 |
| EP | 1109371 | 6/2001 |
| EP | 1182845 | 2/2002 |
| EP | 1280087 | 1/2003 |
| EP | 1303107 | 4/2003 |
| EP | 1320214 | 6/2003 |
| EP | 1528827 | 5/2005 |
| EP | 1594287 | 11/2005 |
| EP | 1633100 | 3/2006 |
| EP | 1772822 | 4/2007 |
| GB | 2372867 | 9/2002 |
| GB | 2414621 | 11/2005 |
| JP | 2002140272 | 5/2002 |
| WO | WO 98/36585 | 8/1998 |
| WO | WO-00/52621 | 9/2000 |
| WO | WO 01/22748 | 3/2001 |
| WO | WO 01/33797 A2 | 5/2001 |
| WO | WO 01/31497 | 6/2001 |
| WO | WO 01/43416 A2 | 6/2001 |
| WO | WO 01/44977 | 6/2001 |
| WO | WO 01/57705 | 8/2001 |
| WO | WO 01/63423 | 8/2001 |
| WO | WO 01/65411 | 9/2001 |
| WO | WO 01/71949 | 9/2001 |
| WO | WO 01/91021 | 9/2001 |
| WO | WO 02/30133 A2 | 4/2002 |
| WO | WO 02/41178 | 5/2002 |
| WO | WO 02/44989 | 6/2002 |
| WO | WO-02/069585 | 9/2002 |
| WO | WO-02/071626 | 9/2002 |
| WO | WO 02/096026 | 11/2002 |
| WO | WO-02/096056 | 11/2002 |
| WO | WO-03/015430 | 2/2003 |
| WO | WO-03/024136 | 3/2003 |
| WO | WO-03/058458 | 7/2003 |
| WO | WO 03/058524 | 7/2003 |
| WO | WO-03/073304 | 9/2003 |
| WO | WO-2007/002025 | 1/2004 |
| WO | WO2004/100470 | 11/2004 |
| WO | WO-2005/029769 | 3/2005 |
| WO | WO-2005/073863 | 8/2005 |
| WO | WO-2006/011164 | 2/2006 |
| WO | WO-2006/024003 | 3/2006 |
| WO | WO-2006/119481 | 11/2006 |
| WO | WO-2006/122042 | 11/2006 |
| WO | WO-2007/031708 | 3/2007 |
| WO | WO-2007/060451 | 5/2007 |
| WO | WO-2007/091089 | 8/2007 |
| WO | WO-2010/018584 | 2/2010 |

OTHER PUBLICATIONS

, "ETSI TS 100 900 V7.2.0 (Jul. 1999):", Digital Cellular Telecommunication System (Phase 2+); Alphabets and language-specific information (GSM 03.38 Version 7.2.0 Release 1998), European Telecommunications Standards Institute 1999.

, "Examination Report under section 18(3)", dated Jan. 23, 2009 issued in related UK Application No. GB 0802989.4 (5 pages).

"Extended European search Report dated Mar. 17, 2008", European Application No. 08101544.8.

"International Preliminary Report on Patentability", Issued Nov. 24, 2009 in International Application No. PCT/IB2008/002897 (1 page).

"International Preliminary Report on Patentability", mailed Dec. 30, 2009 in related International Application PCT/EP2008/057438 (1 page).

"International Search Report (Form PCT/ISA/210) mailed Jan. 22, 2009", International Application No. PCT/EP2008/057438.

"Office Action dated Feb 18, 2011 issued by USPTO", Related U.S. Appl. No. 12/288,690 (38 pages).

"Office Action dated Mar. 31, 2011", Issued in Related U.S. Appl. No. 12/290,140.

"Office Action issued Oct. 19, 2010", USPTO in related U.S. Appl. No. 12/290,140 (11 pages).

"Partial European Search Report", dated Apr. 25, 2008 for European Application No. EP 08151800.3.

"PCT International Search Report from PCT International", searching Authority mailed May 8, 2009 in a related PCT Application No. PCT/EP2009/050144 (4 pages).

"PCT Written Opinion from PCT International Searching Authority", mailed May 8, 2009 in a related PCT Application No. PCT/EP2009/050144 (5 pages).

"U.K. Search Report under Section 17 dated Jun. 4, 2008", U.K. Application No. GB0803468.8.

"WAG UAProf Version Oct. 20, 2001; Wireless Applcation Protocol", WAP-248-UAPROF-20011020-a, Wireless Application Protocol Forum, Ltd. (2001); http://www.wapforum.org/what/copyright.htm.

European Search Report dated May 23, 2008 for European Patent Application No. 08101226.

* cited by examiner

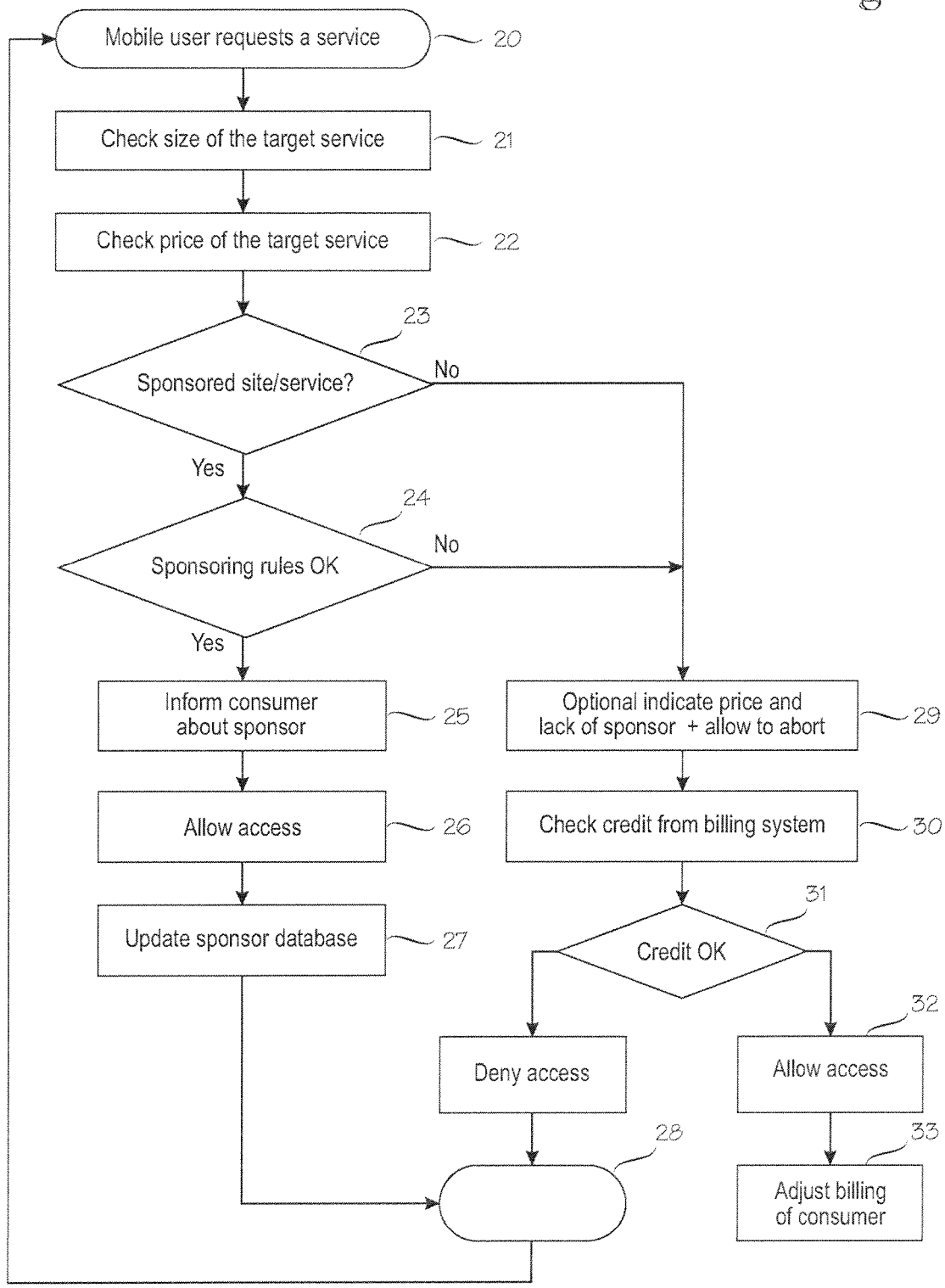

ACCESS CONTROL

This application is U.S. Patent Application that relies for priority under 35 U.S.C. 119 on Application Serial No. GB0709331.3, filed on May 15, 2007, which is incorporated herein by reference.

FIELD OF THE INVENTION

The invention relates to communications system, and particularly to access control in communications systems.

BACKGROUND OF THE INVENTION

Modern multimedia computers and mobile phones are capable of providing web and WAP (Wireless access protocol) browsing with the mobile devices.

Mobile marketing is considered by advertisers as the next new channel to reach direct to the recipient by utilizing the core assets and characteristics of the mobile media: it being personal, "always on", mobile, and naturally forming groups of people who communicate actively with each other. These characteristics combined with social networks—based approaches of the Internet could form a very powerful base to execute marketing strategies.

In general, mobile marketing and advertising can be divided into the following four categories:
  a) Mobile Marketing: The systematic planning, implementing and control of a mix of business activities intended to bring together buyers and sellers for the mutually advantageous exchange or transfer of products where the primary point of contact with the recipient is via their mobile device.
  b) Mobile Advertising: The paid, public, non-personal announcement of a persuasive message by an identified sponsor; the non-personal presentation or promotion by a firm of its products to its existing and potential customers where such communication is delivered to a mobile phone or other mobile device. Examples of mobile advertising would include: WAP Banner ads, mobile search advertising, mobile video bumpers, interstitial ads in on device portals.
  c) Mobile Direct Marketing: Sales and promotion technique in which the promotional materials are delivered individually to potential customers via the potential customer's mobile phone or other mobile device. Examples of mobile direct marketing include the sending of SMS, MMS or WAP push messages, Bluetooth messaging and other interrupt based marketing to mobile phones or other mobile devices.
  d) Mobile customer relation management (CRM): Combination of all the above in a manner that establishes a long-term, engaging relationship between the customer and the promoting company.

In a mobile marketing, like in all mobile communication, there is cost related to communication (SMS, MMS, voice call, data connection, etc.) from and to the recipient. Typically data connection cost in a mobile domain is invoiced from the recipient based on the volume of the data transferred wirelessly to the mobile terminal. There are data plans existing where the invoicing is based on a time of connection, or the data connection can be an unlimited ("all you can eat") package for a given price, or a limited package of e.g. 100 Mbyte/month for given price. There may also be data plans for parties who provide services through a mobile communications network.

Billing and accounting of the data usage is typically carried out in operators billing systems. The options are a prepaid billing where the recipient has paid in advanced, and a post paid billing where the recipient pays according to invoice sent to the recipient typically in a periodic (monthly) manner.

One prior art approach to use specific numbers, such as service numbers with the prefix "0800", to provide toll a free calling. For example, call made to a company's "0800" number are forwarded to the company with charging the calling party.

WO0143416 discloses a host-sponsored data transmission billing system and method for mobile users. An internet gateway is provided to establish wireless connection between a mobile user and the internet. The internet gateway generates billing data for payment by the mobile user for connection requests by the mobile user through the internet gateway to private sites on the internet. On the other hand, the internet gateway also generates billing data for payment by host-sponsors for connection requests by the mobile user to host-sponsored sites on the internet. In other words, some or all of the data traffic billing that is incurred in accessing a host-sponsored site is incurred by the host that operates the site in question.

SUMMARY OF THE INVENTION

In accordance with the aspects of the invention, there is provided a method, an access control system, a database, an advertisement system, a search service system, and a computer program according to the appended claims.

According to an aspect of the invention, a decision whether a service requested by a recipient is a sponsored service for the specific recipient is made based on sponsoring rules, i.e. the delivery of the requested service to the recipient can be sponsored if a sponsoring value of the recipient is sufficient in relation to a resource requirement for provision of the requested service. The sponsoring rules contain various pieces of information for recognizing a sponsored service and for determining the sponsoring value and the cost of the delivery. The sponsoring of different services to different recipients can be controlled, created, deleted, maintained or modified in a very flexible manner by means of the sponsoring rules. The sponsor, such an advertiser, is able to control the cost of sponsoring by affecting the sponsoring value. Very customized sponsoring can be provided for individual recipients or various types of groups of recipients.

BRIEF DESCRIPTION OF THE DRAWINGS

In the following the invention will be described in greater detail by means of exemplary embodiments with reference to the attached drawings, in which

FIG. 3 is a flow diagram illustrating an exemplary functionality of according to embodiments of the invention;

DETAILED DESCRIPTION OF THE INVENTION

Figure 1:
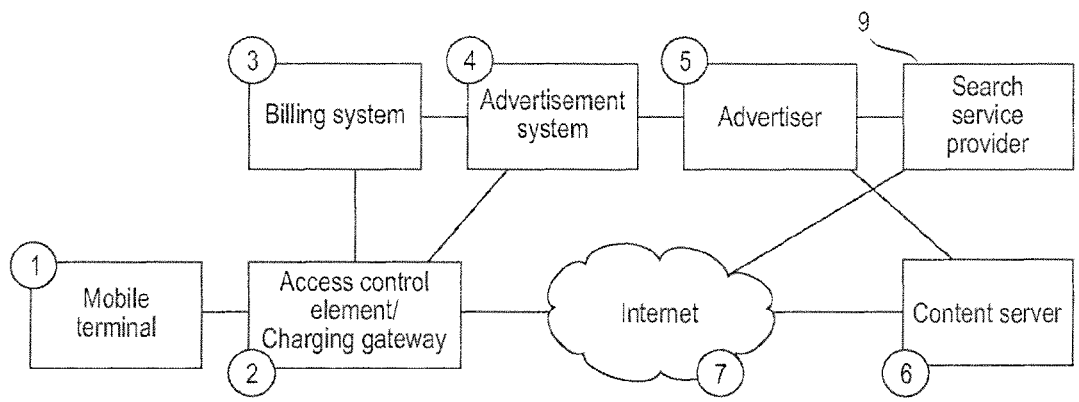
FIG. 1 is a block diagram illustrating a high-level architecture of an exemplary communications system wherein the principles of the present invention may be applied.

FIG. 1 is a block diagram illustrating a high-level architecture of an exemplary communications system wherein the principles of the present invention may be applied. Reference numeral 1 denotes a mobile terminal. The mobile terminal 1 may be mobile phone, personal digital assistant (PDA), multimedia computer, personal computer, lap top, etc., or generally any terminal capable of access in services, such as content download, web browsing, streaming, Wireless Application Protocol (WAP) browsing.

A communication network employed for providing the access connection may be any cellular network technologies which include but are not limited to GSM, WCDMA, CDMA, GPRS, UTRAN, UMTS. In a cellular infrastructure there is a plurality of techniques available for delivering content to recipients (i.e. users, subscribers) having mobile terminals. Examples of such techniques include, but are not limited to, short message service (SMS) delivered via a short message service center (SMSC), a multimedia message service (MMS) delivered via a MMS center (MMSC), Wireless application protocol ((WAP) delivered via a WAP gateway (WAP-GW), and an Internet access point (Internet AP). In addition to traditional cellular networks, local area networks, such as Wireless Local area networks (WLAN), BlueTooth (BT) and other technologies, such as WiMax (Worldwide Interoperability for Microwave Access), Broadcasting over cellular, Broadcasting over DVB-H (Digital Video Broadcasting-Handhelds), ISDB-T (Terrestrial Integrated Services Digital Broadcasting), DMB (Digital Multimedia Broadcasting) may be may used to provide a connection and to deliver a service. The access to services may also be provided by any generic Internet access using any transport methods.

The access to services, such Internet (web) services or other data or messaging services, may be controlled by an access control element or charging gateway 2. The access control element 2 may communicate with a billing system 3 and an advertisement system 4 in order to check if the said user of the mobile terminal has credit or can be credited in behalf of a sponsor to access said services. The functionality of the access control element may be embodied in a dedicated network entity, or in any appropriate existing network entity, such as a short message service center (SMSC), a multimedia message service center (MMSC), Wireless application protocol (WAP) gateway (WAP-GW), an Internet access point (Internet AP), a WLAN access point (AP), a mobile switching center (MSC), a charging gateway, a billing gateway, or in a control intelligence associated with such network entities, such as in a service control point (SCP) of an intelligent network (IN).

The advertisement system 4 is a system which may contain profiles of the recipients using mobile terminals. The advertisement system 4 may be used, in accordance the principles of the present invention, to keep and maintain rules of the sponsoring of access to web services for the recipients. An advertiser 5 may be a sponsor, i.e. $3^{rd}$ party which sets rules of which web services can be accessed on under which conditions and by which recipients. A list of web services can be obtained manually or those can originate from a standard web search query, e.g. from a search service provider 9.

A content server 6 is a server in the web where one or more of the web services are hosted. An example of a web service is a web page, a MP3 file download, a video download, a picture download, a music download, a document download, a streaming service, a video service, a music service, a messaging service, such as electronic mail, XML, HTML, etc., or generally any digital content which can be accessed with a mobile terminal in question.

A search service provider system or server 9 may be any web search service, such as Google or Yahoo. Embodiments involving a search service are discussed below.

Figure 2:
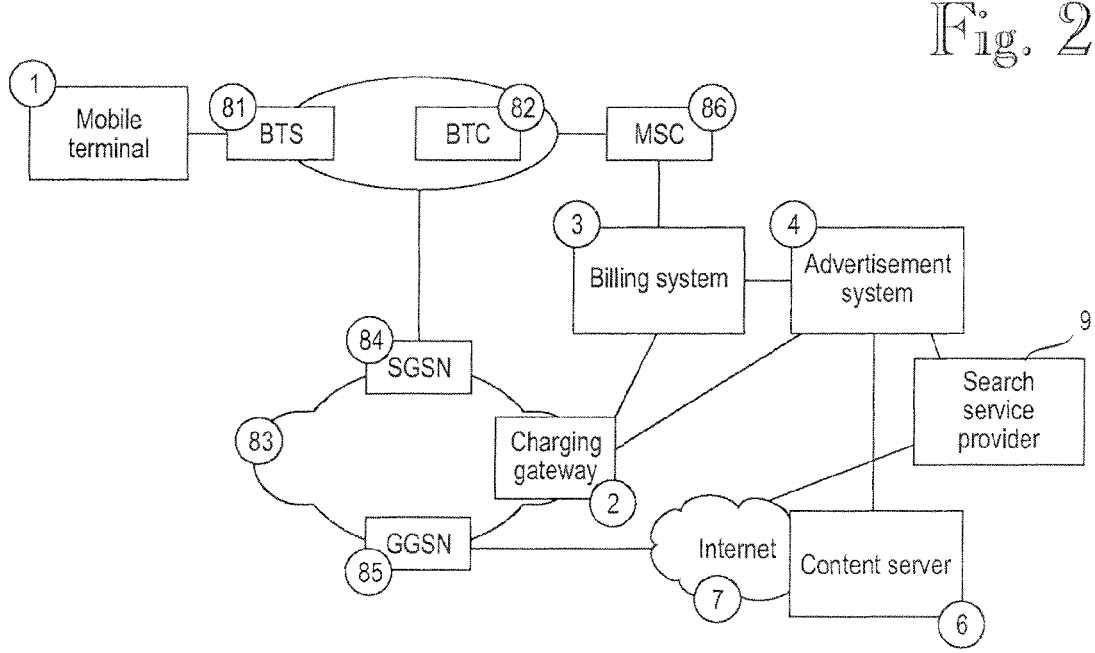
FIG. 2 shows an exemplary implementation of the invention to a cellular network offering data services via GPRS.

FIG. 2 shows an exemplary implementation of an embodiment of the invention to a cellular network offering data services via GPRS (General Packet Radio Service). A mobile terminal 1 is typically connected via base transceiver station (BTS) 81 to a radio access network (RAN) consisting several BTSs and base station controllers (BSC) 81. The RAN is typically connected to a mobile switching center (MSC) 86 that is connected to the billing system 3.

Data services are in GPRS implementation routed via a GPRS core network 83. The GPRS core network 83 may contain at least one serving GPRS support node (SGSN) 84 and at least one gateway GPRS support node (GGSN) 85. The charging gateway 2 may control access of the mobile terminal 1 to the Internet services and communicate with the billing system 3 and, in an embodiment illustrated herein, also with an advertisement system 4.

The Internet connection to content services in the content server 6 is routed via the SGSN 84 and the GGSN 85 to the Internet network 7. The content server 6 can be accessed if the charging gateway 2 enables the GGSN 85 to grant a connection.

FIG. 3 illustrates an exemplary functionality of according to some embodiments of the invention. This exemplary functionality may be applied to the exemplary system shown in FIG. 1, or to the exemplary system shown in FIG. 2, or to any communications system wherein a sponsored access to and/or delivery of services is desired. It should be appreciated that the term 'sponsoring' as used herein is intended to refer to various ways of sponsoring, such as sponsoring the actual cost of the content i.e. the service, and sponsoring the data access cost of the service.

The mobile user requests a service, e.g. access to a web site (step 20). The size of the target service (e.g. in terms of data bytes when accessing web site or other digital content) and/or the price of the target service (for example, ringing tone download, music download or video download, or paid web information service access, or any content download) may be determined in steps 21 and 22, respectively. In step 23, it is checked (e.g. from a database in the advertisement system 4) if the web site or the target service is sponsored. If the web site or the target service is sponsored, it is checked whether the sponsoring rules defined for the target service or the target site are met regarding this mobile user (step 24).

In case an access target service or site is not sponsored in step 23, or the sponsoring rules are not met in step 24, the recipient will be continue the access to the target service (e.g. browsing the web site) without sponsoring, i.e. using the mobile user's own credit. Therefore, before accessing the target service, mobile user may be informed (e.g. by means of a message) of the price of the target service/site and the lack of sponsoring or lack of full sponsoring for the target service/site and given possibility to abort the session (step 29). This branch of the procedure may continue according to any suitable access control and billing method. In a typical system, the credit of the user is checked from the billing system (steps 30 and 31). If the user has not got sufficient credit, the access is denied (step 34). If the user has got a sufficient credit, the access is allowed (step 32), and after the service completed, the mobile user's balance of the billing system 4 is adjusted, e.g. credited according to the price of the target service (step 33).

In case the target service or site is sponsored in step 23, or the sponsoring rules are met in step 24, the mobile user may be informed that the advertiser 5 is sponsoring the service (step 25) and the access is allowed (step 26). The database in the advertisement system 4 may be updated to note of the sponsoring event, e.g. for allowing subsequent statistics and analysis, or billing of advertisers.

The credit of the mobile user in the billing system 3 is adjusted based on the sponsoring rules. For example, the adjustment may include one or more of: no charge, a discounted charge, and an extra benefit of using the service. The adjustment may be made at the time of using the service, e.g. using a modified price for the service instead of the normal price, or the credited price may be returned afterwards to the user. Also a log may be created for billing purposes to the advertisers. The price of the service access may be invoiced from the advertiser or the web service owner, or some other sponsoring party. The advertiser or the web service owner may be billed according to set pricing agreements on 'click through to web site' rules or 'click to performance' rules or like. The billing may be based post-paid or prepaid payments by the advertiser or other sponsor. In both cases the credit of the advertiser or other sponsor may be checked and controlled in the billing system 4.

The sponsoring rules database may contain, for example, information about the profiles of the recipients, status of the recipients, a list of web sites and services which are sponsored to which users, user groups and/or user profiles, an allowed number of accesses to a sponsored content, a number of accesses already made to a sponsored content, a location of the recipient, historical data of a recipient's behavior, historical data on a behavior of a profile of users, information of sent direct advertisement to a recipient, information of the content vouchers/coupons sent to a recipient, codes of vouchers/coupons sent to a recipient, etc.

In an embodiment of the invention, a specific feature of sponsoring rules includes checking of the (personal) related data plan of the mobile user (recipient) and the data size of the target service, such as a web site, to be accessed. As the cost (particularly the data transmission cost) related to use of the target service (e.g. browsing a web site) may be dependent on the time of day/week/month/date, e.g. it may be lower at the night time, also the threshold of allowing free/subsidized access by the sponsor may be lower during those hours.

In an embodiment of the invention, another feature of the sponsoring rules may include a value of the recipient to advertiser or sponsor. The value of the user to sponsors may differ depending on the profile of the recipient.

Example of the rules database for determining whether a specific target service or site can be indicated as free or subsidized to a specific recipient is shown in the Table 1 below. In the example shown, there are a group of recipients A, B, C and D. The recipients A and B have the same data plan, i.e. they are normally charged 1 € per each megabyte of the transferred data. The recipients C and D are normally charged 0.5 € and 0.7 €, respectively, per each megabyte of the transferred data. The parameter 'User entry value, represents the amount of money the sponsor (e.g. advertiser) is willing to pay for an entry of a user to a service or site. The entry value may be based on a bid. The entry value may be based on the user profile. The entry value may be based on the past usage history. Typically, the user entry values for the sponsor vary depending on the user or the user profile and the target service or the web site. For example, the user entry value of the customer C is 0.1 € to the site www.onemoreexample.com but 0 € to the site www.4thexample.com. The value of the user for a specific URL may also vary depending on the time and/or bid from the sponsor.

TABLE 1

Example database for determining which browsing action is free.

| URL | Size | Sponsored | Data plan | User entry value | Indication to user |
|---|---|---|---|---|---|
| www.example.com | 147 kbyte | Yes | 1 €/Mbyte | 0.2 €/entry | Free site to access |
| www.otherexample.com | 2 Mbyte | Yes | 1 €/Mbyte | 1.2 €/entry | No free access/ subsidized |
| www.onemoreexample.com | 1 Mbyte | Yes | 0.5 €/Mbyte | 0.1 €/entry | No free access |
| www.3rdexample.com | 1.5 Mbyte | Yes | 0.7 €/Mbyte | 3 €/entry | Free access |
| www.4thexample.com | 700 kbyte | No | 0.5 €/Mbyte | 0 €/entry | No free access |

According to an embodiment of the invention, a basic rule on determining whether a specific target service or site can be indicated as free or subsidized to user may be IF cost of delivery >(user value+desired margin)
THEN access is NOT free.

An access to a service or site may be free (fully sponsored, no charge), partly sponsored (a reduced charge) and/or gain extra benefit to a customer. Rules on allowing a free or partly sponsored access or an access with extra benefit may include time of day for the access, amount of time which can be used to access the service or site, amount of data which can be consumed when accessing the service or site, amount of money which can be used when accessing the service or site, list of services or sites sponsored by the sponsor, actions to be made after the sponsoring event, actions related to the sponsoring event, actions to be made before the sponsoring event, etc.

Example of the actions includes adding a banner advertisement in the top of the web page which is accessed. According to an aspect of the invention, such action may be sending an advertising message to a customer after/during/before a sponsored event, such as browsing. A further example is sending of a (e.g. short message service, SMS, based) message to recipient after accessing the web site: "Your browsing to www.example.com was sponsored by SoftDrink Corp." An exemplary action made before a browsing may relate to sending of a message (e.g. SMS) to a recipient which informs about a sponsored web service for said user. Examples of such pre-advertising message may include: "You can browse the web for next 15 minutes free of charge. Sponsored by AutoDealer Ltd", "Visit our web site for free, www.example-.com", "Download movie trailer now from our web site www-.movie_producer.com", etc.

One application of the present invention is in association with web searches. Exemplary implementations of such web search arrangements are illustrated in FIGS. 4A, 4B and 5.

Figure 4A:
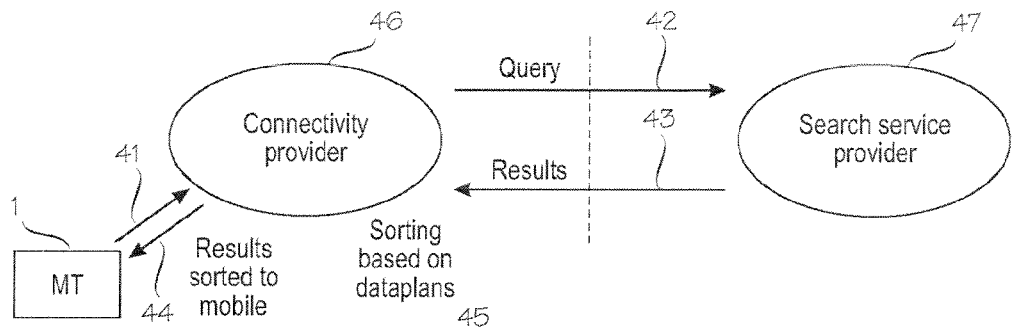
FIG. 4A illustrates an exemplary implementation of search service arrangements which employ principles of the present invention.

Referring now to FIG. 4A, a recipient having a mobile terminal 1 performs a search query 41, 42 through a connectivity provider's system 46 to a $3^{rd}$ party web search service 47, such as Google or Yahoo. The connectivity provider's system 46 may be implemented by means of the exemplary systems shown in FIGS. 1 and 2, for instance. In FIGS. 1 and 2, the search service 9 would correspond to search service 47 in FIGS. 4A, 4B and 5. The search service 47 sends, as a query response 43, a result list containing the links found in the search. A network entity in the connectivity provider's system 46 may analyze the URLs in the search result list using the sponsoring rules according to the present invention. The analysis may yield a modified search result list 44 which indicates which of the search results are free or otherwise sponsored for the recipient. The recognition of the sponsored ULRs in the initial search list may be in accordance with the exemplary procedure shown in FIG. 6.

Figure 4B:
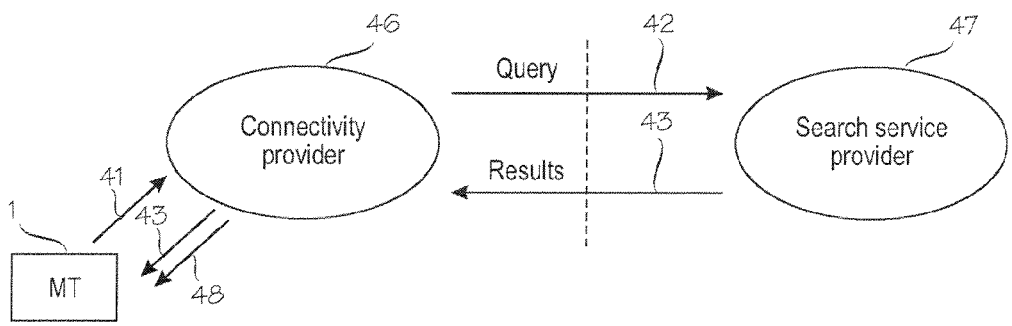
FIG. 4B illustrates another exemplary implementation of search service arrangements which employ principles of the present invention.
Figure 5:
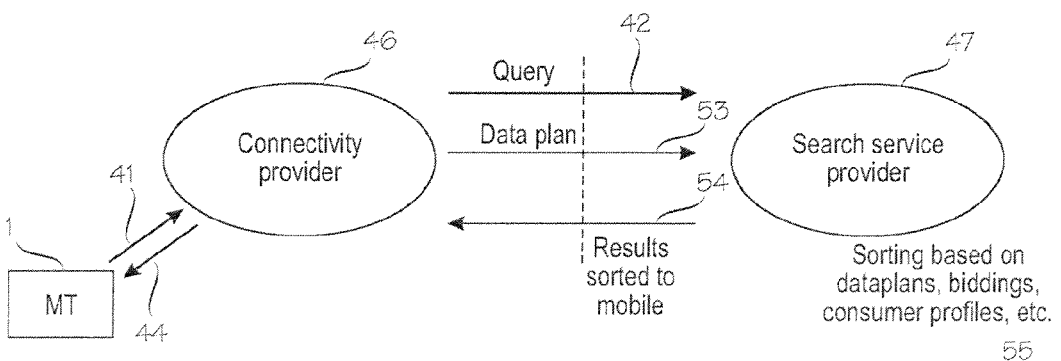
FIG. 5 illustrates still another exemplary implementation of search service arrangements which employ principles of the present invention.

Another embodiment of the invention is shown in FIG. 4B. Similarly to FIG. 4A, a recipient having a mobile terminal 1 performs a search query 41, 42 through a connectivity provider's system 46 to a $3^{rd}$ party web search service 47, such as Google or Yahoo. The search service 47 sends, as a query response 43, a result list containing the links found in the search. A network entity in the connectivity provider's system 46 may analyze the URLs in the search result list using the sponsoring rules according to the present invention. The analysis may yield a separate data structure 48 which contains information indicating which ones of the search results on the initial search results list are free or otherwise sponsored for the recipient. Then the initial search results list 43 and the separate sponsoring data structure 48 are sent to the mobile telephone 1. The recognition of the sponsored ULRs in the initial search list may be in accordance with the exemplary procedure shown in FIG. 6.

Figure 6:
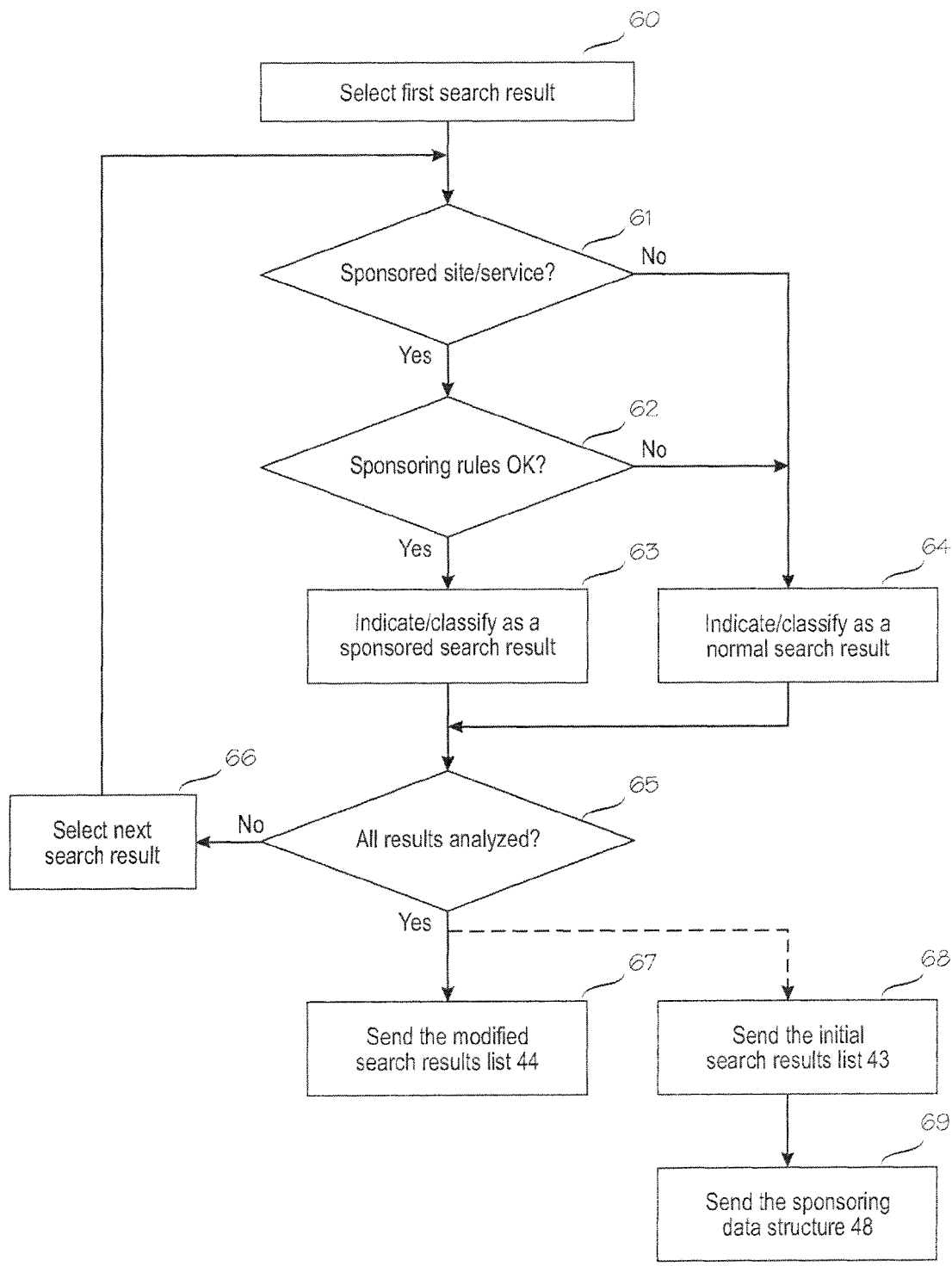
FIG. 6 is a flow diagram illustrating an exemplary functionality for sorting search results.

Referring to FIG. 6, upon obtaining the initial search results list (step 60), it is checked (e.g. checks from a database, such as Table 1) if the first result on the list (e.g. URL, web site or the target service) is sponsored (step 61). If the web site or the target service is sponsored, it is checked whether the sponsoring rules defined for the target service or the target site are met regarding this specific recipient (step 62). This may include checking the price and the size of the target service. The steps 61-62 may be similar to steps 21-24 discussed above with reference to FIG. 3.

In case the target service or site is not sponsored in step 61, or the sponsoring rules are not met in step 62, no changes to the search result list regarding this service or site (e.g. it indicated/classified as a normal link on the list) are made, step 64. Then the process proceeds to step 65.

In case the target service or site is sponsored in step 61, or the sponsoring rules are met in step 62, the search results list maybe modified to indicate that the specific item (e.g. URL, web site or service) is sponsored (step 63). The modifying means that the sponsoring information is somehow included in the search results. For example, the search results may be re-organized in such a manner that free to access results are shown in the top of the search result list. The organizing of the results may combine a commonly known bid process to order the results according to both parameters the cost of delivery for the recipient and the bid by the advertiser. For example, if the initial search result list contains the URL www.example-.com shown in Table 1, this would be indicated to be free for the customer A in the case all sponsoring rules are met. For example, the sponsored URL(s) may be displayed in the top of the modified search results list, indicated with a distinguishing font, format, etc, and/or tagged or marked as sponsored URLs in some other way. According to another embodiment of the invention, rather than making any modifications to the initial search results list, the initial search results list 43 is maintained unchanged in step 63, and the sponsored search result is classified and registered in a separate data structure 48, such as in a separate list of sponsored search results. The database in the advertisement system and/or the billing system may be updated to note of the advertising event, e.g. for allowing subsequent statistics, analysis, and/or billing the sponsor by the operator running the system according to the invention.

In step 65, it is checked whether all items on the initial search results list have been analyzed. If not, next item on the initial list is selected (step 66) and the process returns to step 61. If all items on the list have been analyzed in step 65, the modified (e.g. sorted) search results list may be then sent 44 to the mobile terminal 1 (step 67). Thus, the modified search results list may be considered as one type of advertisement message sent to the customer before the actual sponsoring event. According to another embodiment, the initial search results list 43 may be first sent unchanged (step 68), and then separate information, e.g. the data structure 48 created in the classification step 63, is sent which indicates the sponsored search results in the initial search results list (step 69). In the case the customer selects one of sent search results and thereby requests an access to the corresponding target service or site, one of the procedures described with respect to FIGS. 1-3, or any other procedure according to the invention may be performed to check whether the access is sponsored or not. Alternatively, some other method may be used to indicate that the selected service or site has already been recognized as a sponsored link for the specific user, e.g. by means of the tagged or marked URLs mentioned above. For example, the access control element/charging gateway 2 may be set up so that as the browsing took place on the link provided in the modified search result 44, the billing system 5 may be notified not to invoice the customer for the related data cost of the browsing session or to subsidize the session. The access/browsing may then be billed from the advertiser, sponsor or the search service provider. Basically, the selection (clicking, activation) of an item (e.g. link) in a search result list may be considered as a special case of a service request in the embodiments described with reference to FIGS. 1-3 above.

In the embodiment shown in FIG. 4A, a sponsoring database of the search service provider 47 may give information about the sponsored sites, user entry values, user profiles, etc. to the connectivity provider 46 which then makes the sorting 45 based on the dataplans obtained locally. The connectivity provider 46 may then bill the sponsored access from the search service provider 47.

Another aspect of the invention is illustrated in FIG. 5. Similarly to FIGS. 4A and 4B, a recipient having a mobile terminal 1 performs a search query 41, 42 through a connectivity provider's system 46 to a $3^{rd}$ party web search service 47, such as Google or Yahoo. The connectivity provider 46 (or recipient) may further send a dataplan and/or data delivery cost related information 53 to the $3^{rd}$ party search provider 47. The connectivity provider may also have a data plan indicating charging rate for each sponsor (such an advertiser), and or a data plan indicating charging rate for each service request receiver (such as Google or Yahoo). Upon obtaining the initial search results list (step 60), the 3$^{rd}$ party search provider 47 may check which search result on the list (e.g. URL, web site or the target service) is sponsored for the particular mobile customer. The procedure may be similar to that described above with reference to FIG. 6. The search service provider 47 may then send 54 the modified search result list to the connectivity provider 46 which may forward 44 the modified search results to the mobile terminal 1. The credit of the search service provider/and or web site provider is checked before granting/communicating free access to recipient. In the case the customer selects one of the items on the modified search results list and thereby requests an access to the corresponding target service or site, one of the procedures described with respect to FIGS. 1-3, or any other procedure according to the invention may be performed to check whether the access is sponsored or not. Alternatively, some other method may be used to indicate that the selected service or site has already been recognized as a sponsored link for the specific user, e.g. by means of the tagged or marked URLs mentioned above. For example, the access control element/charging gateway 2 may be set up so that as the browsing took place on the link provided in the modified search result 44, the billing system 5 may be notified not to invoice the customer for the related data cost of the browsing session or to subsidize the session. The access/browsing may then be billed from the advertiser, sponsor or the search service provider. Basically, the selection (clicking, activation) of an item (e.g. link) in a search result list may be considered as a special case of an access request in the embodiments described with reference to FIGS. 1-3 above. The techniques described herein may be implemented by various means. For example, these techniques may be implemented in hardware (one or more devices), firmware (one or more devices), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) and executed by one or more processors/computers. The data storage medium or the memory unit may be implemented within the processor/computer or external to the processor/computer, in which case it can be communicatively coupled to the processor/computer via various means as is known in the art. Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art.

It will be obvious to a person skilled in the art that, as the technology advances, the inventive concept can be implemented in various ways. The invention and its embodiments are not limited to the examples described above but may vary within the scope of the claims.

The invention claimed is:

1. A method comprising:
    receiving a request for a service from a mobile terminal of a communication recipient;
    determining a resource requirement for provision of the service to the mobile terminal, wherein the resource requirement is indicative of a cost to deliver the service to the mobile terminal, determined by:
    identifying a size of the service;
    identifying a data plan of the recipient; and
    calculating the cost to deliver service to the mobile terminal based on the identified size of the service and the identified data plan of the recipient;
    if the service is a sponsored service, determining for a sponsored service a sponsoring value for sponsoring provision of the service to the mobile terminal based on sponsoring rules, wherein the sponsoring value represents an amount of money which a sponsor is willing to pay to subsidize the delivery of the service to the mobile terminal and the value varies depending on a profile of the recipient; and
    sponsoring the provision of the service to the mobile terminal if the sponsoring value of the communication recipient meets a predetermined level in relation to the resource requirement, wherein the resource requirement is indicative of a cost to deliver the service to the mobile terminal and the sponsoring value is indicative of an amount which a sponsor is willing to subsidize the delivery of the service to the mobile terminal.

2. The method of claim 1, further comprising enabling an unsponsored provision of the service to the communication recipient if the sponsoring value of the communication recipient for the service is not sufficient in relation to the resource requirement for provision of the service or if the service is not the sponsored service.

3. The method of claim 1, further comprising informing the communication recipient of a sponsoring party, if the provision of the service is sponsored.

4. The method of claim 1, further comprising updating a sponsoring database with data indicative of sponsoring the provision of the service.

5. The method of claim 1, wherein sponsoring comprises at least one of free delivery, a discounted resource requirement for delivery, and an extra benefit associated with delivery.

6. The method of claim 1, further comprising applying a resource quota for the provision of the service to an account associated with a sponsoring party.

7. The method of claim 1, wherein the service includes at least one of a web page, a browsing, a file download, a video download, a picture download, a music download, a document download, a streaming service, a video service, a voice service, a messaging service, a music service, digital content, and a digital service which can be accessed through a communications system.

8. The method of claim 1, wherein the sponsoring rules include at least one of predetermined sponsoring values for sponsoring the service to a specific recipient and an algorithm for determining sponsoring values for sponsoring the service based on at least one further piece of information contained in the sponsoring rules.

9. The method of claim 1, wherein the sponsoring rules include at least one of a data plan indicating resource requirements for each sponsored service to a specific recipient, and data size of the sponsored service.

10. The method of claim 1, wherein the sponsoring rules include an algorithm for determining the resource requirement for provision of the service based on at least one other piece of information in the sponsoring rules.

11. The method of claim 1, wherein the sponsoring rules include at least one of a data plan indicating resource requirements for each sponsored service to a specific recipient, profiles of recipients, a first data plan indicating resource requirements for each sponsor, a second data plan indicating resource requirements for each service request receiver, status of recipients, a list of services which are sponsored to which recipients, recipient groups, recipient profiles, an allowed number of accesses to the sponsored service, a number of accesses already made to the sponsored service, a recipient location, historical data of recipient behavior, historical data on a behavior of a profile of recipients, information of direct advertisement sent to the recipient, information of at least one of content vouchers and coupons sent to the recipient, codes of at least one of vouchers and coupons sent to the recipient, at least one of a time of day, a time of week, a time of month, and a date of a sponsored access, an amount of time which can be used to access the sponsored service, amount of data which can be consumed when accessing the sponsored service, amount of money which can be used when accessing the sponsored service, list of sponsored services, actions to be made after a sponsoring event, actions related to the sponsoring event, and actions to be made before the sponsoring event.

12. The method of claim 1, further comprising indicating a lack of sponsoring to the communication recipient if the provision of the service is not sponsored.

13. The method of claim 1, further comprising indicating a quota of the sponsored resource to the communication recipient if the provision of the service is not fully sponsored.

14. The method of claim 1, further comprising allowing the communication recipient to choose between continuing and aborting access to the service if the provision of the service is not sponsored.

15. The method of claim 1, further comprising sending at least one advertisement message to the customer at least one of before, during, and after the provision of the service.

16. The method of claim 15, wherein the advertisement message contains an indication of at least one sponsored service.

17. The method of claim 1, wherein the request is a search query.

18. The method of claim 17, further comprising:
sending to a customer a search query response containing search results; and
indicating in the search query response one of the search results which is linked to sponsored services.

19. The method of claim 1, further comprising:
receiving an initial search query response containing search results from a search service provider;
determining which ones of the search results are linked to services which are sponsored to the customer based on the sponsoring rules;
providing sponsoring information which indicates the search results in the initial search query response which are linked to sponsored services; and
sending both the initial search query response and the sponsoring information to the customer.

20. The method of claim 1, further comprising:
receiving an initial search query response containing search results from a search service provider;
determining which ones of the search results are linked to services which are sponsored to the communication recipient based on the sponsoring rules;
modifying the initial search query response to indicate the search results which are linked to sponsored services to yield a modified search query response; and
sending the modified search query response to the communication recipient.

21. The method of claim 19, further comprising receiving at least one piece of information for the sponsoring rules from the search service provider.

22. The method of claim 18, further comprising:
receiving, from a search service provider, the search query response containing search results, the search query response being arranged to indicate the search results which are linked to sponsored services; and
sending the search query response to the communication recipient.

23. The method of claim 22, further comprising sending to the search service provider, in association with a search query, a data plan indicating resource quotas for each sponsored service to a specific recipient to enable the search service provider to determine which search results are linked to sponsored services.

24. The method of claim 17, wherein the service request from the mobile terminal of the communication recipient is responsive to activation of one of the search results in the search query response by the communication recipient.

25. The method of claim 18, further comprising billing the provision of the service to the search service provider.

26. A system, comprising:
a receiver configured to receive a request for a service from a mobile terminal of a communication recipient;
a processor of a computing device configured to determine a resource requirement for provision of the service to the mobile terminal, wherein the resource requirement is indicative of a cost to deliver the service to the mobile terminal, determined by:
identifying a size of the service;
identifying a data plan of the recipient; and
calculating the cost to deliver service to the mobile terminal based on the identified size of the service and the identified data plan of the recipient;
if the service is a sponsored service, the processor is further configured to determine for a sponsored service a sponsoring value for sponsoring provision of the service to the mobile terminal based on sponsoring rules, wherein the sponsoring value represents an amount of money which a sponsor is willing to pay to subsidize the delivery of the service to the mobile terminal and the value varies depending on a profile of the recipient; and
a billing component configured to sponsor the provision of the service to the mobile terminal if the sponsoring value of the communication recipient meets a predetermined level in relation to the resource requirement, wherein the resource requirement is indicative of a cost to deliver the service to the mobile terminal and the sponsoring value is indicative of an amount which a sponsor is willing to subsidize the delivery of the service to the mobile terminal.

27. The system of claim 26, wherein the system is at least partly embodied in a charging gateway of a communication system.

28. The system of claim 26, further comprising a database for storing the sponsoring rules.

29. A non-transitory computer readable medium having instructions thereon for causing a computing device to perform steps comprising:
receiving a request for a service from a mobile terminal of a communication recipient;
determining a resource requirement for provision of the service to the mobile terminal, wherein the resource requirement is indicative of a cost to deliver the service to the mobile terminal, determined by:
identifying a size of the service;
identifying a data plan of the recipient; and
calculating the cost to deliver service to the mobile terminal based on the identified size of the service and the identified data plan of the recipient;
if the service is a sponsored service, determining for a sponsored service a sponsoring value for sponsoring provision of the service to the mobile terminal based on sponsoring rules, wherein the sponsoring value represents an amount of money which a sponsor is willing to pay to subsidize the delivery of the service to the mobile terminal and the value varies depending on a profile of the recipient; and sponsoring the provision of the service to the mobile terminal if the sponsoring value of the communication recipient meets a predetermined level in relation to the resource requirement, wherein the resource requirement is indicative of a cost to deliver the service to the mobile terminal and the sponsoring value is indicative of an amount which a sponsor is willing to subsidize the delivery of the service to the mobile terminal.

30. A system comprising:

a communication device configured to receive a search query from a communication recipient's mobile terminal;

a search device configured to carry out a search and obtain at least one search result in response to receiving the search query; and a processor configured to determine which of the at least one search results is linked to services which are sponsored to the communication recipient based on sponsoring rules, wherein the processor determines if a link is sponsored by performing the following operations:

determining a resource requirement for provision of the service linked to the at least one search result to a communication recipient, wherein the resource requirement is indicative of a cost to deliver the service to the mobile terminal, determined by:

identifying a size of the service;

identifying a data plan of the recipient; and calculating the cost to deliver service to the mobile terminal based on the identified size of the service and the identified data plan of the recipient;

determining, for a sponsored service, a sponsoring value for sponsoring provision of the service linked to the at least one search result to the communication recipient, if the service linked to the at least one search result is a sponsored service, wherein the sponsoring value represents an amount of money which a sponsor is willing to pay to subsidize the delivery of the service to the mobile terminal and the value varies depending on a profile of the recipient; and determining that a service linked to the at least one search result is sponsored if the sponsoring value of the communication recipient is at least a predetermined level in relation to the resource requirement for provision of the service, wherein the resource requirement is indicative of a cost to deliver the service to the mobile terminal and the sponsoring value is indicative of an amount which a sponsor is willing to subsidize the delivery of the service to the mobile terminal.

31. The system of claim 30, wherein the processor is further configured to provide a search query response which indicates which of the at least one search results are linked to sponsored services.

32. The system of claim 31, wherein the communication device is further configured to send the search query response to the communication recipient.

* * * * *